US012722636B2

(12) United States Patent
Sadamura et al.

(10) Patent No.: US 12,722,636 B2
(45) Date of Patent: Sep. 1, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Satoshi Sadamura, Tokyo (JP); Hiroshi Oguro, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 18/590,990

(22) Filed: Feb. 29, 2024

(65) Prior Publication Data

US 2024/0326806 A1 Oct. 3, 2024

(30) Foreign Application Priority Data

Mar. 30, 2023 (JP) ................................ 2023-055380

(51) Int. Cl.
*B60W 30/14* (2006.01)
*B60W 30/18* (2012.01)
*B60W 50/14* (2020.01)

(52) U.S. Cl.
CPC .... *B60W 30/146* (2013.01); *B60W 30/18163* (2013.01); *B60W 50/14* (2013.01);
(Continued)

(58) Field of Classification Search
CPC ......... B60W 30/146; B60W 30/18163; B60W 50/14; B60W 2520/10; B60W 2552/30;
(Continued)

(56) References Cited

U.S. PATENT DOCUMENTS 9,959,762 B1 * 5/2018 Kim ...................... B60R 21/013
2018/0037223 A1 2/2018 Goto et al.
(Continued)

FOREIGN PATENT DOCUMENTS

JP 2004-142686 5/2004
JP 2004142686 A * 5/2004
(Continued)

OTHER PUBLICATIONS

Japanese Office Action for Japanese Patent Application No. 2023-055380 mailed Dec. 3, 2024.

*Primary Examiner* — Daniel M. Robert

(74) *Attorney, Agent, or Firm* — Amin, Turocy & Watson, LLP

(57) ABSTRACT

A vehicle control device determines whether or not the vehicle has made a lane change, performs assistance control which is one or both of deceleration control for decelerating the vehicle so that a speed of the vehicle approaches a target speed based on curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road, and controls a process of operating or stopping the assistance control in accordance with presence or absence of the lane change of the vehicle while the vehicle is traveling in the segment or on the curved road.

11 Claims, 9 Drawing Sheets

(52) U.S. Cl.
CPC ..... *B60W 2520/10* (2013.01); *B60W 2552/30* (2020.02); *B60W 2552/53* (2020.02)

(58) Field of Classification Search
CPC ........... B60W 2552/53; B60W 30/143; B60W 30/18154; B60W 30/18145; B60W 10/04; B60W 10/192; B60W 10/20; B60W 50/16; B60W 2050/143; B60W 2050/146; B60W 2552/05; B60W 2710/18; B60W 2710/20
See application file for complete search history.

(56) References Cited

U.S. PATENT DOCUMENTS

| | | | | |
|---|---|---|---|---|
| 2019/0146519 | A1* | 5/2019 | Miura | G05D 1/0246 701/28 |
| 2020/0247417 | A1* | 8/2020 | Kato | B60K 35/10 |
| 2021/0370924 | A1* | 12/2021 | Kuno | B60W 30/0956 |
| 2021/0387619 | A1* | 12/2021 | Yatagai | B60W 30/146 |

FOREIGN PATENT DOCUMENTS

| | | | | |
|---|---|---|---|---|
| JP | 5668321 | | 2/2015 | |
| JP | 2016-193666 | | 11/2016 | |
| JP | 2021-196690 | | 12/2021 | |
| WO | WO-2023225811 | A1 * | 11/2023 | B60K 35/28 |

* cited by examiner

M
T
M
T+2
M
M
T+2#
M
M
L1
L2
VEHICLE SPEED
VEHICLE SPEED
TIME
LONGITUDINAL G
VEHICLE SPEED
0
ACCELERATION
DECELERATION
TIME
DRIVER
LANE CHANGE CONSIDERATION
LANE CHANGE OPERATION
TRAVEL
NOTIFICATION
HMI
NO NOTIFICATION
DISPLAY
NO NOTIFICATION
TRAVEL CONTROL
NO CONTROL
DECELERATION
NO CONTROL

M
T
M
T+2
M
M
T+2#
M
M
L1
L2
VEHICLE SPEED
VEHICLE SPEED
TARGET VEHICLE SPEED
TIME
LONGITUDINAL G
VEHICLE SPEED
ACCELERATION
0
DECELERATION
TIME
DRIVER
LANE CHANGE CONSIDERATION
LANE CHANGE OPERATION
TRAVEL
HMI
NO NOTIFICATION
DISPLAY
NO NOTIFICATION
TRAVEL CONTROL
NO CONTROL
DECELERATION
NO CONTROL

FIG. 7

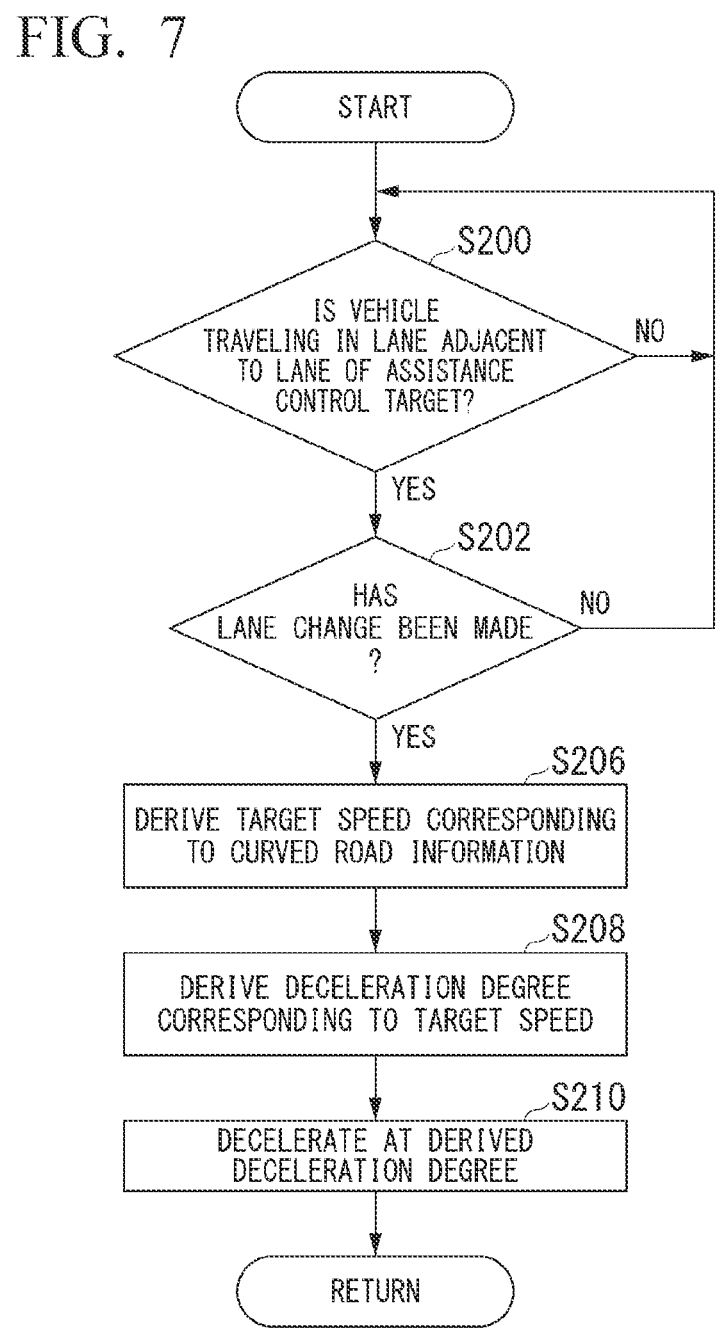

START
S200
IS VEHICLE TRAVELING IN LANE ADJACENT TO LANE OF ASSISTANCE CONTROL TARGET?
NO
YES
S202
HAS LANE CHANGE BEEN MADE ?
NO
YES
S206
DERIVE TARGET SPEED CORRESPONDING TO CURVED ROAD INFORMATION
S208
DERIVE DECELERATION DEGREE CORRESPONDING TO TARGET SPEED
S210
DECELERATE AT DERIVED DECELERATION DEGREE
RETURN

M
T
T+2
T+2#
L1
L2
VEHICLE SPEED
VEHICLE SPEED
V1
V2
TIME
LONGITUDINAL G
VEHICLE SPEED
0
ACCELERATION
DECELERATION
TIME
DRIVER
LANE CHANGE CONSIDERATION
LANE CHANGE OPERATION
TRAVEL
NOTIFICATION
HMI
NO NOTIFICATION
DISPLAY
NO NOTIFICATION
TRAVEL CONTROL
NO CONTROL
DECELERATION
NO CONTROL

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-055380, filed Mar. 30, 2023, the content of which is incorporated herein by reference.

BACKGROUND

Field of the Invention

The present invention relates to a vehicle control device, a vehicle control method, and a storage medium.

Description of Related Art

In recent years, efforts to provide sustainable transportation systems that take into account various situations have become active. In order to implement this, research and development are aimed to further improve traffic safety and convenience through research and development of driving assistance technology. For example, a curve approach control device including a scheduled lane estimation means for estimating a scheduled travel lane at a forward branch before passing the forward branch on the basis of branch information about a branch of a road in front of a host vehicle, host vehicle position information, and travel lane information and a braking warning determination means for determining to permit a braking warning when the scheduled lane estimation means can estimate the scheduled travel lane after branching as a case in which a curve that becomes a forward braking warning target is detected and to prevent the braking warning otherwise is disclosed (Japanese Patent No. 5668321). This curve approach control device reduces discomfort for a driver by performing control suitable for a branching destination road of a main lane in which the vehicle will actually travel.

SUMMARY OF THE INVENTION

In conventional devices, a relationship between assistance control for performing one or both of deceleration of a vehicle and a notification (or warning) for a driver of the vehicle and behavior of the vehicle is not taken into account. For this reason, it is difficult to appropriately control an assistance control process according to the behavior of the vehicle.

The present invention has been made in consideration of such circumstances, and an objective of the present invention is to provide a vehicle control device, a vehicle control method, and a storage medium capable of appropriately controlling an assistance control process in accordance with behavior of a vehicle. For example, the assistance control can be operated (continued) or stopped in accordance with the behavior of the vehicle to assist a driver in driving. By extension, it can contribute to the development of a sustainable transportation system by taking into account occupants.

A vehicle control device, a vehicle control method, and a storage medium according to the present invention adopt the following configurations.

(1): According to an aspect of the present invention, there is provided a vehicle control device including: a storage medium storing computer-readable instructions; and one or more processors connected to the storage medium, the processor executing the computer-readable instructions to: acquire curved road information about a curved road located in a travel direction of a vehicle; determine whether or not the vehicle has made a lane change; perform assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and control a process of operating or stopping the assistance control in accordance with presence or absence of the lane change of the vehicle while the vehicle is traveling in the segment or on the curved road.

(2): In the above-described aspect (1), the processor executes the computer-readable instructions to stop the assistance control when the vehicle has made the lane change to a second lane, which is not connected to the curved road and is adjacent to a first lane, while the vehicle is traveling in the first lane in the segment.

(3): In the above-described aspect (1), the processor executes the computer-readable instructions to operate the assistance control when the vehicle has made the lane change to the first lane while the vehicle is traveling in a second lane adjacent to the first lane and not connected to the curved road in the segment.

(4): In the above-described aspect (2) or (3), the processor executes the computer-readable instructions to decelerate the vehicle at a first deceleration degree when the vehicle is traveling in the first lane and has reached a start point of the segment and decelerate the vehicle at a second deceleration degree greater than the first deceleration degree when the vehicle has further approached the entrance to the curved road.

(5): In the above-described aspect (4), the processor executes the computer-readable instructions to start a notification for notifying the driver of the vehicle that the curved road is approaching after the vehicle is decelerated at the first deceleration degree and before the vehicle is decelerated at the second deceleration degree.

(6): In the above-described aspect (2) or (3), the processor executes the computer-readable instructions to determine that the vehicle has made the lane change when a reference position of the vehicle has reached the second lane or a road marking for dividing the first lane and the second lane.

(7): In the above-described aspect (6), the reference position is set at a center of the vehicle or near the center of the vehicle related to a vehicle width direction.

(8): In the above-described aspect (2) or (3), the processor executes the computer-readable instructions to determine the lane change on the basis of an ON or OFF state of a direction indicator.

(9): In the above-described aspect (1), the processor executes the computer-readable instructions to perform the assistance control on the basis of curved road information about a different curved road when the vehicle has made a lane change to a third lane connected to a curved road different from the curved road connected to the first lane and adjacent to the first lane while the vehicle is traveling in the first lane in the segment.

(10): According to another aspect of the present invention, there is provided a vehicle control method including: acquiring, by a computer, curved road information about a curved road located in a travel direction of a vehicle; determining, by the computer, whether or not the vehicle has made a lane change; performing, by the computer, assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and controlling, by the computer, a process of operating or stopping the assistance control in accordance with presence or absence of the lane change of the vehicle while the vehicle is traveling in the segment or on the curved road.

(11): According to yet another aspect of the present invention, there is provided a non-transitory computer storage medium storing a program for causing a computer to: acquire curved road information about a curved road located in a travel direction of a vehicle; determine whether or not the vehicle has made a lane change; perform assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and control a process of operating or stopping the assistance control in accordance with presence or absence of the lane change of the vehicle while the vehicle is traveling in the segment or on the curved road.

According to the aspects (1) to (11), in the vehicle control device, the vehicle control method, and the storage medium, it is possible to appropriately control the assistance control process according to the presence or absence of the lane change. For example, the assistance control can be operated (continued) or stopped in accordance with the behavior of the vehicle to assist the driver in driving.

According to the aspect (2), the vehicle control device can suppress deceleration when the vehicle has made the lane change to a lane not connected to the curved road.

According to the aspect (3), the vehicle control device can appropriately perform deceleration when the vehicle has made a lane change to a lane connected to the curved road.

According to the aspect (4), the vehicle control device can notify the driver what type of operation is necessary before the vehicle is decelerated at the second deceleration degree of main braking by decelerating the vehicle at the first deceleration degree of initial braking.

According to the aspect (5), because a notification is provided after the initial braking, the vehicle control device can notify the driver what type of operation is necessary. Furthermore, because the notification is provided at the above timing, it is possible to allow the driver to reliably recognize what type of operation is necessary while suppressing making the driver feel inconvenient to the notification.

According to the aspects (6) and (7), the vehicle control device can assist the driver in driving because a lane change can be determined even if the driver does not use the direction indicator.

According to the aspect (8), because the vehicle control device can determine the lane change at an early stage, it can assist the driver by performing control corresponding to the lane change at an early stage.

According to the aspect (9), the vehicle control device can assist the driver in driving by appropriately controlling the vehicle even if a lane of a lane change destination is connected to the curved road.

BRIEF DESCRIPTION OF THE DRAWINGS

FIG. 7 is a flowchart showing an example of a flow of a process executed by an assistance controller.

DETAILED DESCRIPTION OF THE INVENTION

Hereinafter, embodiments of a vehicle control device, a vehicle control method, and a storage medium of the present invention will be described with reference to the drawings.

Embodiments

[Overall Configuration]

Figure 1:
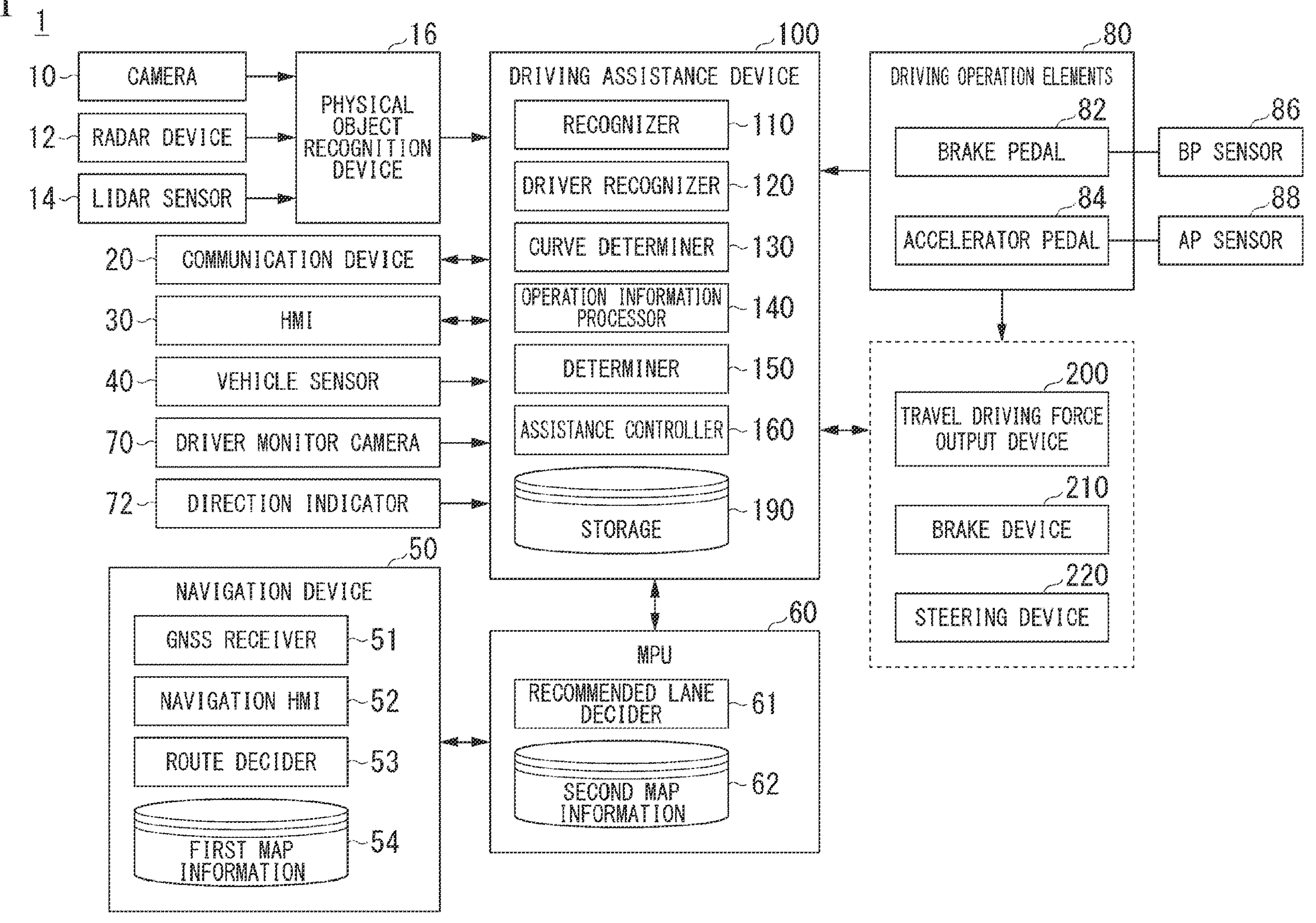
FIG. 1 is a configuration diagram of a vehicle system using a vehicle control system according to an embodiment.

FIG. 1 is a configuration diagram of a vehicle system 1 using a vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, a direction indicator 72, a driving operation element 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The driving assistance device 100 is an example of a "vehicle control device."

For example, the camera 10 is a digital camera using a solid-state imaging element such as a charge-coupled device (CCD) or a complementary metal oxide semiconductor (CMOS). The camera 10 is attached to any location on the vehicle (hereinafter referred to as a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M (or electromagnetic waves having a wavelength close to that of light) and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. The physical object recognition device 16 may be omitted from the vehicle system 1.

The communication device 20 communicates with another vehicle located in the vicinity of the vehicle M, using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the vehicle M and receives an input operation by the occupant. The HMI 30 includes various types of display devices, a speaker, a buzzer, a touch panel, a switch, keys, and the like. The HMI 30 includes a display device. The display device (display) is, for example, a display device, i.e., a multi-information display, for displaying various information in the vehicle M such as a speedometer indicating a traveling speed of the vehicle M or a tachometer indicating a rotational speed of the internal combustion engine provided in the vehicle M provided in the center of the instrument panel of the vehicle M.

The vehicle sensor 40 includes a vehicle speed sensor configured to detect the speed of the vehicle M, an acceleration sensor configured to detect acceleration, a yaw rate sensor configured to detect angular velocity around a vertical axis, a direction sensor configured to detect a direction of the vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. The recommended lane decider 61 decides in what lane numbered from the left the vehicle will travel. The recommended lane decider 61 decides on the recommended lane so that the vehicle M can travel along a reasonable route for traveling to a branching destination when there is a branch point on the route on the map.

The second map information 62 is map information with higher accuracy than the first map information 54. The second map information 62 includes, for example, information about a center of a lane, information about a boundary of the lane, or the like. The second map information 62 may include road information, traffic regulation information, address information (address/postal code), facility information, telephone number information, and the like. The second map information 62 may be updated at any time by the communication device 20 communicating with other devices. The second map information 62 includes information such as a position of a curved road, the curvature of the curved road, a curve radius of the curved road, and a gradient of the curved road. This information may be included in the first map information 54. Also, the second map information 62 or the first map information 54 may include information indicating whether or not it is a curved road of an assistance control target to be described below.

The driver monitor camera 70 is, for example, a digital camera that uses a solid-state image sensor such as a CCD or a CMOS. The driver monitor camera 70 is attached to any location on the vehicle M with respect to a position and a direction where the head of the occupant (hereinafter, the driver) sitting in the driver's seat of the vehicle M can be imaged from the front (in a direction in which his/her face is imaged). For example, the driver monitor camera 70 is attached to an upper part of a display device provided on the central portion of the instrument panel of the vehicle M. The driver monitor camera 70 outputs an image obtained by imaging the cabin including the driver of the vehicle M from an arrangement position to the driving assistance device 100.

The direction indicator 72 is controlled in accordance with an operation of the driver on an operator (not shown). For example, when the driver has performed an operation to flash the direction indicator 72, the direction indicator 72 flashes.

The driving operation elements 80 include, for example, a brake pedal 82, an accelerator pedal 84, a steering wheel, a direction indicator operation switch, a shift lever, and other operation elements. A sensor that detects an amount of operation or the presence or absence of operation is attached to the driving operation element 80, and the detection result is output to the driving assistance device 100 or some or all of the travel driving force output device 200, the brake device 210, and the steering device 220. The steering wheel does not necessarily have to be annular and may be in the form of a variant steering wheel, a joystick, a button, or the like. A brake pedal sensor (BP sensor) 86 is attached to the brake pedal 82. An accelerator pedal sensor (AP sensor) 88 is attached to the accelerator pedal 84.

The BP sensor 86 detects an operation amount corresponding to an operation of the driver on the brake pedal 82. The AP pedal sensor 88 detects an opening degree of the accelerator pedal that changes with the driver's operation on the accelerator pedal 84.

The driving assistance device 100 includes, for example, a recognizer 110, a driver recognizer 120, a curve determiner 130, an operation information processor 140, a determiner 150, an assistance controller 160, and a storage 190. Some or all of these functional elements are implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the driving assistance device 100 or may be stored in a removable storage medium such as a DVD or a CD-ROM and installed in an HDD or a flash memory of the driving assistance device 100 when the storage medium (the non-transitory storage medium) is mounted in a drive device. The curve determiner 130 is an example of an acquirer and the assistance controller 160 is an example of a controller.

The storage 190 is implemented by an HDD, a flash memory, an electrically erasable programmable read-only memory (EEPROM), a read-only memory (ROM), a random-access memory (RAM), or the like.

On the basis of information input from the camera 10, the radar device 12, and the LIDAR sensor 14 via the physical object recognition device 16, the recognizer 110 recognizes a state of a position, velocity, acceleration, and the like of a physical object in the vicinity of the vehicle M. The position of the physical object, for example, is recognized as a position of an absolute coordinate system having a representative point of the vehicle M (a center of gravity, a drive shaft center, or the like) as the origin, and is used for control. The position of the physical object may be represented by a representative point such as the center of gravity or a corner of the physical object or may be represented in a region. The "state" of the physical object may include the acceleration or jerk of the physical object, or the "action state" (for example, whether or not the lane is changing or is about to change).

Also, for example, the recognizer 110 recognizes a lane in which the vehicle M is traveling (a travel lane). For example, the recognizer 110 recognizes the travel lane by comparing a pattern of road markings (for example, an arrangement of solid lines and broken lines) obtained from the second map information 62 with a pattern of road markings in the vicinity of the vehicle M recognized from an image captured by the camera 10. The recognizer 110 may recognize a travel lane by recognizing a runway boundary (road boundary) including a road marking, a shoulder, a curb, a median strip, a guardrail, and the like as well as a road marking. In this recognition, a position of the vehicle M acquired from the navigation device 50 or a processing result of the INS may be taken into account. The recognizer 110 recognizes a temporary stop line, an obstacle, red traffic light, a toll gate, and other road events.

When the travel lane is recognized, the recognizer 110 recognizes a position or an orientation of the vehicle M with respect to the travel lane. For example, the recognizer 110 may recognize a gap of a reference point of the vehicle M from the center of the lane and an angle formed between the travel direction of the vehicle M and a line connected to the center of the lane as a relative position and orientation of the vehicle M related to the travel lane. Alternatively, the recognizer 110 may recognize a position of the reference point of the vehicle M related to one side end portion (a road marking or a road boundary) of the travel lane or the like as a relative position of the vehicle M related to the travel lane.

The driver recognizer 120 detects whether or not the driver is in a predetermined state on the basis of the image captured by the driver monitor camera 70. The predetermined state is a state in which hands-off lane keeping control to be described below can be executed. Hands-off is a state in which the driver is not gripping the steering wheel and hands-on is a state in which the driver is gripping the steering wheel. The state in which hands-off lane keeping control can be executed is a state in which the driver is monitoring the front (or the vicinity of the vehicle M). Forward monitoring indicates, for example, that the driver monitors the front so that the driver can quickly makes a change from a state in which the vehicle system 1 controls the vehicle M to a state in which the driver operates the vehicle M. Forward monitoring indicates, for example, that the driver's visual line is facing forward. Whether or not the driver is in a hands-on state or a hands-off state is determined on the basis of a detection result of a grip sensor that detects the gripping state of the steering wheel (not shown).

The curve determiner 130 acquires curved road information about a curved road located in a travel direction of the vehicle M. The curved road information is, for example, information about a position of the curved road, a shape of the curved road, and the like. The curve determiner 130, for example, identifies a position of the curved road for the vehicle M on the basis of the position of the vehicle M obtained from the second map information 62 and the curved road information.

The operation information processor 140 acquires operation information about an acceleration operation of the driver of the vehicle M. The operation information is, for example, information indicating an accelerator pedal opening degree output from the AP pedal sensor 88. The operation information processor 140 acquires operation information about a deceleration operation of the driver of the vehicle M. For example, operation information processor 140 acquires information indicating an operation amount on the brake pedal output from the BP sensor 86. The operation information processor 140, for example, acquires the driver's operation state for equipment mounted in the vehicle M. For example, when the driver performs an operation of flashing the direction indicator 72, the operation information processor 140 acquires information indicating that this operation has been performed.

The determiner 150 determines whether or not the vehicle M has made a lane change. Details of this process will be described below.

The assistance controller 160 assists the driver in controlling the vehicle M. For example, the assistance controller 160 automatically controls the travel driving force output device 200 and the brake device 210 without depending on the driver's operation, and automatically controls the speed of the vehicle M. The assistance controller 160 executes so-called adaptive cruise control (ACC).

For example, when there is no other vehicle within a predetermined distance from the vehicle M in front of the vehicle M, the assistance controller 160 automatically controls the travel driving force output device 200 and the brake device 210 without depending on the driver's operation so that the vehicle M travels at a speed set by the driver, a legal speed, and a speed preset in accordance with a road.

For example, when there is another vehicle in front of the vehicle M and within a predetermined distance from the vehicle M, the assistance controller 160 automatically controls the travel driving force output device 200 and the brake device 210 without depending on the driver's operation to track the other vehicle. Tracking indicates that the vehicle M is behind the other vehicle and travels while maintaining a position a predetermined distance from the other vehicle.

The assistance controller 160 controls the steering device 220 so that the vehicle M does not deviate from the travel lane. For example, the assistance controller 160 controls the steering device 220 so that the vehicle M travels in the center or near the center of the travel lane recognized by the recognizer 110. For example, the assistance controller 160 executes hands-off lane keeping control for controlling the steering of the vehicle M in a state in which the driver is not gripping the steering wheel or hands-on lane keeping control for controlling the steering of the vehicle M in a state in which the driver is gripping the steering wheel.

The assistance controller 160 automatically changes lanes of the vehicle M. For example, the assistance controller 160 generates a trajectory for changing lanes and causes the vehicle M to change lanes so that the vehicle M travels along the generated trajectory. The assistance controller 160 causes the vehicle M to change lanes (auto lane change (ALC)) on the basis of a destination set by an occupant and a recommended lane output to the MPU 60.

The assistance controller 160 may automatically change lanes of the vehicle M when the driver instructs the driver to change lanes. The lane change instruction is an operation on a lever part of an operation switch of the direction indicator. For example, when the driver operates the lever part in a direction in which the vehicle M wants to change lanes, the vehicle M changes lanes in the direction corresponding to the operation. The lane change instruction may be an operation different from the operation of the lever part of the operation switch of the direction indicator. For example, when a predetermined operation button is pressed, a lane change may be performed. A part or all of a control process of the assistance controller 160 may be omitted.

Further, the assistance controller 160 assists the driver so that the vehicle M can travel smoothly on the curved road by decelerating the vehicle M to a speed corresponding to the curved road or providing a notification related to deceleration to the driver when the vehicle M enters the curved road or while the vehicle M is traveling on the curved road. Hereinafter, this control may be referred to as assistance control.

The travel driving force output device 200 outputs a travel driving force (torque) for enabling the traveling of the vehicle M to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the assistance controller 160 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the assistance controller 160 or the information input from the driving operation element 80 so that brake torque according to a braking operation is output to each wheel.

For example, the steering device 220 includes a steering ECU and an electric motor. For example, the electric motor changes a direction of steerable wheels by applying a force to a rack and pinion mechanism. The steering ECU drives the electric motor in accordance with the information input from the assistance controller 160 or the information input from the driving operation element 80 to change the direction of the steerable wheels.

[Assistance Control]

While the vehicle M is traveling in a first lane connected to the curved road in a segment from an entrance to the curved road to a position a predetermined distance before the entrance or while the vehicle M is traveling on the curved road, the assistance controller 160 performs assistance control that is one or both of deceleration control for decelerating the vehicle M so that a speed of the vehicle M approaches a target speed based on the curved road information and notification control for notifying that the speed of the vehicle M approaches the target speed. The assistance control is, for example, a process to be executed when the driving assistance device 100 does not automatically control the speed of the vehicle M (for example, ACC is not activated) and the driver controls the speed of the vehicle M. The target speed is a speed determined according to a shape of the curved road, a legal speed of the curved road, or the like.

A target of assistance control may be a curved road that satisfies a condition. The condition is, for example, that a curve radius is within a predetermined range. The predetermined range is a curve radius at which deceleration is required when the vehicle M is traveling.

The assistance control may be performed on the condition that the speed of the vehicle M is less than or equal to a predetermined speed. The predetermined speed is a speed that does not deviate from the speed limit or recommended speed of the curved road or the road before or after the curved road by a predetermined speed or more. The predetermined speed is, for example, a speed obtained by adding a set speed (for example, 30 km/h) to the above speed limit or recommended speed.

The assistance control may be performed when the condition of the road surface satisfies a criterion. Satisfying the criterion indicates that, for example, there is no event that affects the braking operation, such as the road surface not being frozen. For example, the recognizer 110 may recognize a road surface situation on the basis of a detection result of the physical object recognition device 16 or the driving assistance device 100 may recognize a road surface situation on the basis of information provided by the other device. The assistance control may be performed when a gradient of the curved road is less than a threshold value.

Figure 2:
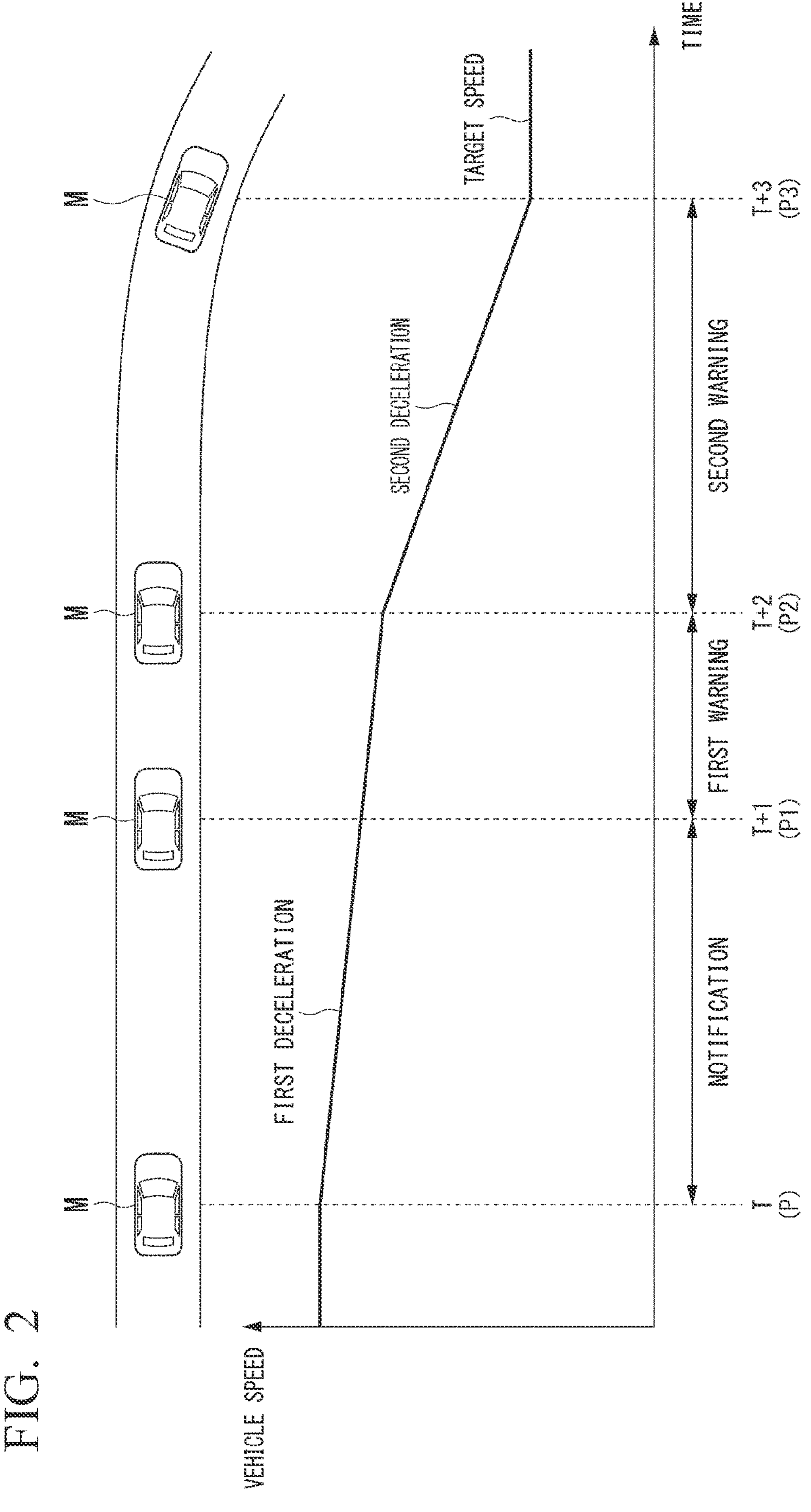
FIG. 2 is a diagram for describing assistance control.

FIG. 2 is a diagram for describing assistance control. The assistance controller 160 decelerates the vehicle M at a first deceleration degree when the vehicle M is traveling in the first lane and the vehicle M has reached the start point of the above segment and decelerates the vehicle M at a second deceleration degree greater than the first deceleration degree when the vehicle M further approaches an entrance to the curved road. After decelerating the vehicle M at the first deceleration degree and before decelerating the vehicle M at the second deceleration degree, the assistance controller 160 initiates a notification (for example, a first warning) indicating that the curved road is approaching to the driver of the vehicle M. Hereinafter, this will be specifically described with reference to FIG. 2.

Time T is a timing when the vehicle M reaches a position P the predetermined distance before the entrance to the curved road. The position the predetermined distance before is a preset position according to the target speed. For example, the position the predetermined distance before is set as a position farther from the entrance to the curved road when the deviation between the speed of the vehicle M and the target speed is larger. The position the predetermined distance before is set as a position where the time when a preset notification is performed, the time when a preset first warning is performed, and the time when a preset second warning is performed can be secured when a brake override or an accelerator override is not performed as described below.

After passing the position P, the vehicle M passes positions P1, P2, and P3 in that order. The time at which the vehicle M reaches the position P is time T, the time at which the vehicle M reaches the position P1 is time T+1, the time at which the vehicle M reaches the position P2 is time T+2, and the time at which the vehicle M reaches the position P3 is time T+3. The entrance to the curved road is provided between the position P2 and the position P3. The entrance to the curved road is, for example, a position where the road (lane) begins to bend or a position where the road has a curvature of a threshold value or more.

At time T, when the speed of the vehicle M is greater than the target speed, the assistance controller 160 provides a notification to the driver and decelerates the vehicle M at a first deceleration degree. The notification is a notification that makes the driver aware of the curved road. Examples of the notification include a notification that the vehicle M has approached a curved road in a state in which the speed of the vehicle M is greater than the target speed or a notification for starting assistance control for decelerating the vehicle M so that the speed of the vehicle M approaches the target speed. The notification is performed, for example, via the HMI 30. The notification may be an image notification, or a voice or vibration notification (for example, vibrating a seat belt).

At time T+1, the assistance controller 160 performs a first warning for the driver. The first warning is a warning that makes the driver aware of the curved road. The first warning is, for example, a warning for the driver, and is a warning to decelerate the vehicle M so that the speed of the vehicle M approaches the target speed.

The assistance controller 160 performs a second warning for the driver at time T+2, decelerates the vehicle M at a second deceleration degree, and causes the speed of the vehicle M to match the target speed at time T+3. The second deceleration degree is a deceleration degree greater than the first deceleration degree. The second warning is a warning that makes the driver aware of the curved road. The second warning is a warning for the driver, and is a warning to decelerate the vehicle M so that the speed of the vehicle M approaches the target speed. The second warning is a warning stronger than the first warning. The stronger warning is a warning that makes the driver feel the need to decelerate more. For example, for the stronger warning, the assistance controller 160 provides an image that prompts the driver to decelerate, outputs a louder sound, or gives a larger vibration to the driver.

As described above, the assistance controller 160 provides assistance for the vehicle M to travel on a curved road. Thereby, it is possible to assist the driver in operating so that the vehicle M travels smoothly on the curved road at the target speed.

[Override of Deceleration Operation]

When the driver operates the brake pedal 82 to a predetermined operation degree or more while the assistance control is being performed, the assistance controller 160 causes the vehicle M to decelerate by stopping the assistance control and controlling the brake device 210 in accordance with the driver's operation. Hereinafter, this control may be referred to as a brake override.

Figure 3:
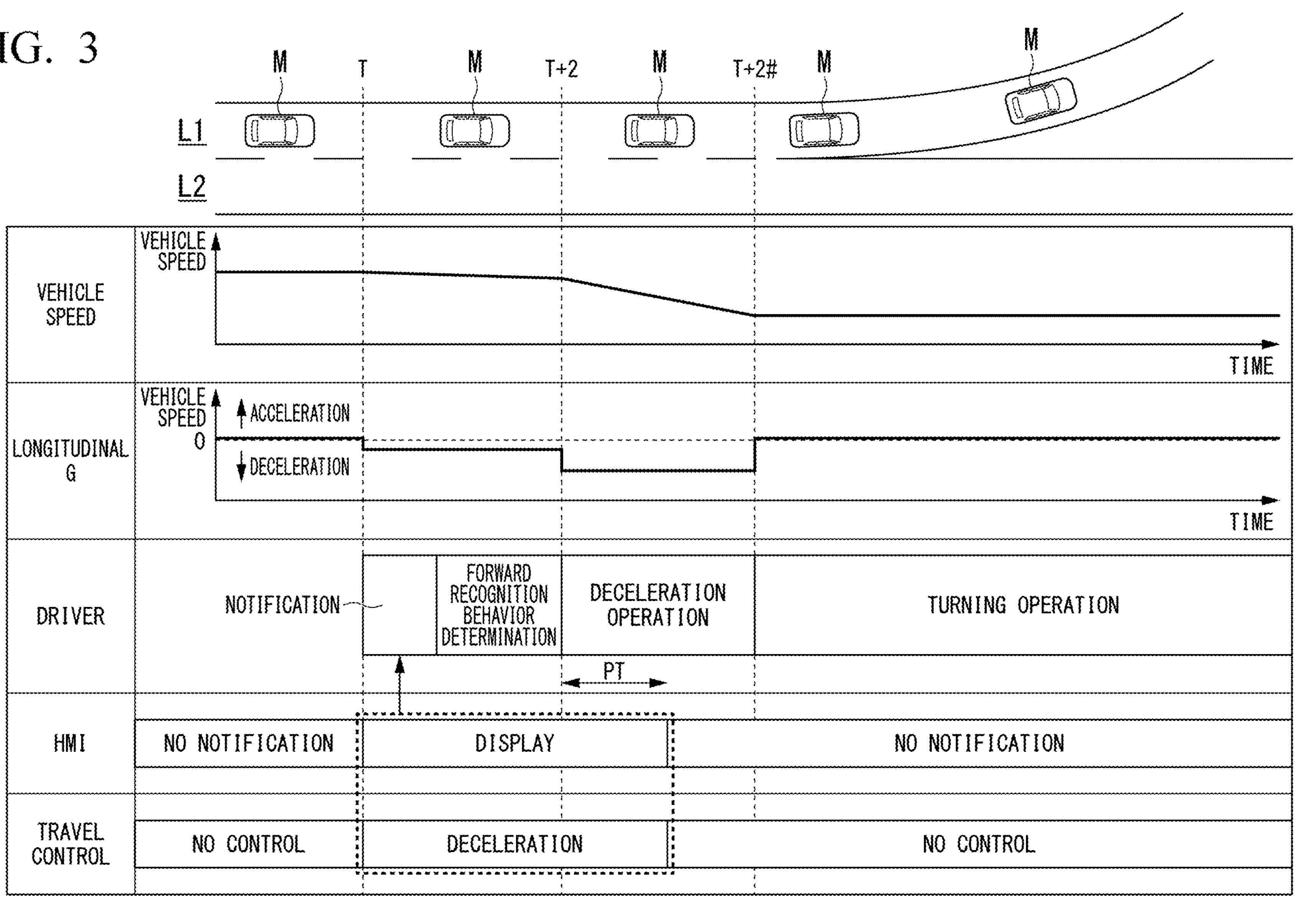
FIG. 3 is a diagram for describing a brake override.

FIG. 3 is a diagram for describing the brake override. The vehicle M is traveling in a first lane L1 connected to the curved road. The first lane L1 is a lane adjacent to the second lane L2 not connected to the curved road. Between time T and time T+2, the assistance controller 160 decelerates the vehicle M at a first deceleration degree and provides a notification or a first warning via the HMI 30. The driver detects a change in gravity (longitudinal G) in the travel direction of the vehicle M as the vehicle M decelerates and further recognizes that the vehicle M is approaching a curved road according to the notification or the first warning via the HMI. When the driver operates the brake pedal 82 at a predetermined operation degree or more for a predetermined time PT (for example, 2 sec, 3 sec, or the like) according to the above-described recognition, the assistance control stops at time T+2 #. When the brake pedal 82 is operated as described above, the assistance controller 160 considers that the driver recognizes the curved road and is trying to decelerate the vehicle M to a speed corresponding to the curved road, and stops the assistance control. Thereby, the notification or warning is stopped and a deceleration control process of the assistance controller 160 is further stopped.

For example, even if the curved road is not recognized, the driver may reflexively operate the brake pedal 82 according to a notification or warning. In this case, it is not appropriate to perform a brake override. In the present embodiment, as described above, when the driver operates the brake pedal 82 at the predetermined operation degree or more and for the predetermined time PT, the assistance control is stopped, such that it is possible to cause the brake override to be established after the driver is allowed to recognize the curved road. Thus, the assistance controller 160 can stop the assistance control at an appropriate timing.

[Process of Stopping Assistance Control Based on Lane Change]

The assistance controller 160 controls a process of operating or stopping the assistance control in accordance with presence or absence of a lane change of the vehicle M while the vehicle M is traveling in the above-described segment (the segment from the entrance to the curved road to the position the predetermined distance from the entrance). The start point of the above-described segment is, for example, the position at time T. For example, the assistance controller 160 stops the assistance control when the vehicle M has made the lane change to a second lane L2, which is not connected to the curved road and is adjacent to a first lane L1, while the vehicle M is traveling in the first lane L1 in the above-described segment.

Figure 4:
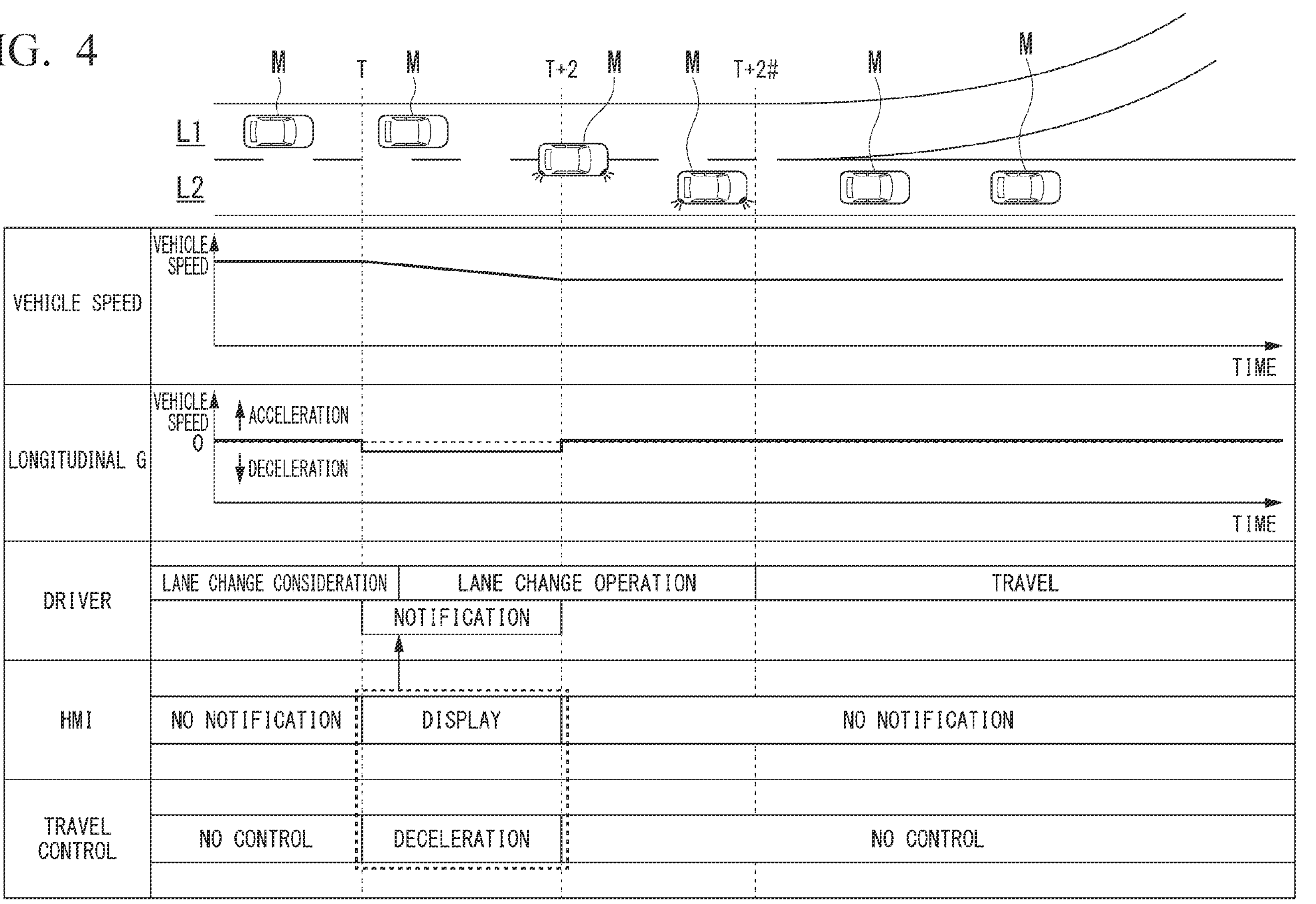
FIG. 4 is a diagram for describing a process of stopping the assistance control based on a lane change.

FIG. 4 is a diagram for describing a process of stopping the assistance control based on a lane change. As shown in FIG. 4, in the above-described segment (for example, at time T+2), when the vehicle M has made a lane change from the first lane L1 to the second lane L2, the assistance controller 160 stops the assistance control. In this case, the assistance controller 160 stops the deceleration of the vehicle M and further stops the notification or warning.

After the assistance control is stopped, the assistance controller 160 may increase the acceleration in accordance with the operation of the driver on the accelerator pedal 84 as in normal manual driving or may suppress the acceleration as described in [accelerator override] to be described below.

As described above, when the vehicle M has made a lane change from the first lane L1 to the second lane L2, the assistance controller 160 can suppress deceleration by stopping assistance control and can control the vehicle M so that it is possible to control the vehicle M according to the driver's intention.

[Process of Operating Assistance Control Based on Lane Change]

The assistance controller 160 controls a process of operating or stopping the assistance control in accordance with presence or absence of the lane change of the vehicle while the vehicle is traveling in the above-described segment. The assistance controller 160 operates the assistance control when the vehicle M has made the lane change to the first lane L1 while the vehicle M is traveling in the second lane L2, which is adjacent to the first lane L1 and is not connected to the curved road in the above-described segment.

Figure 5:
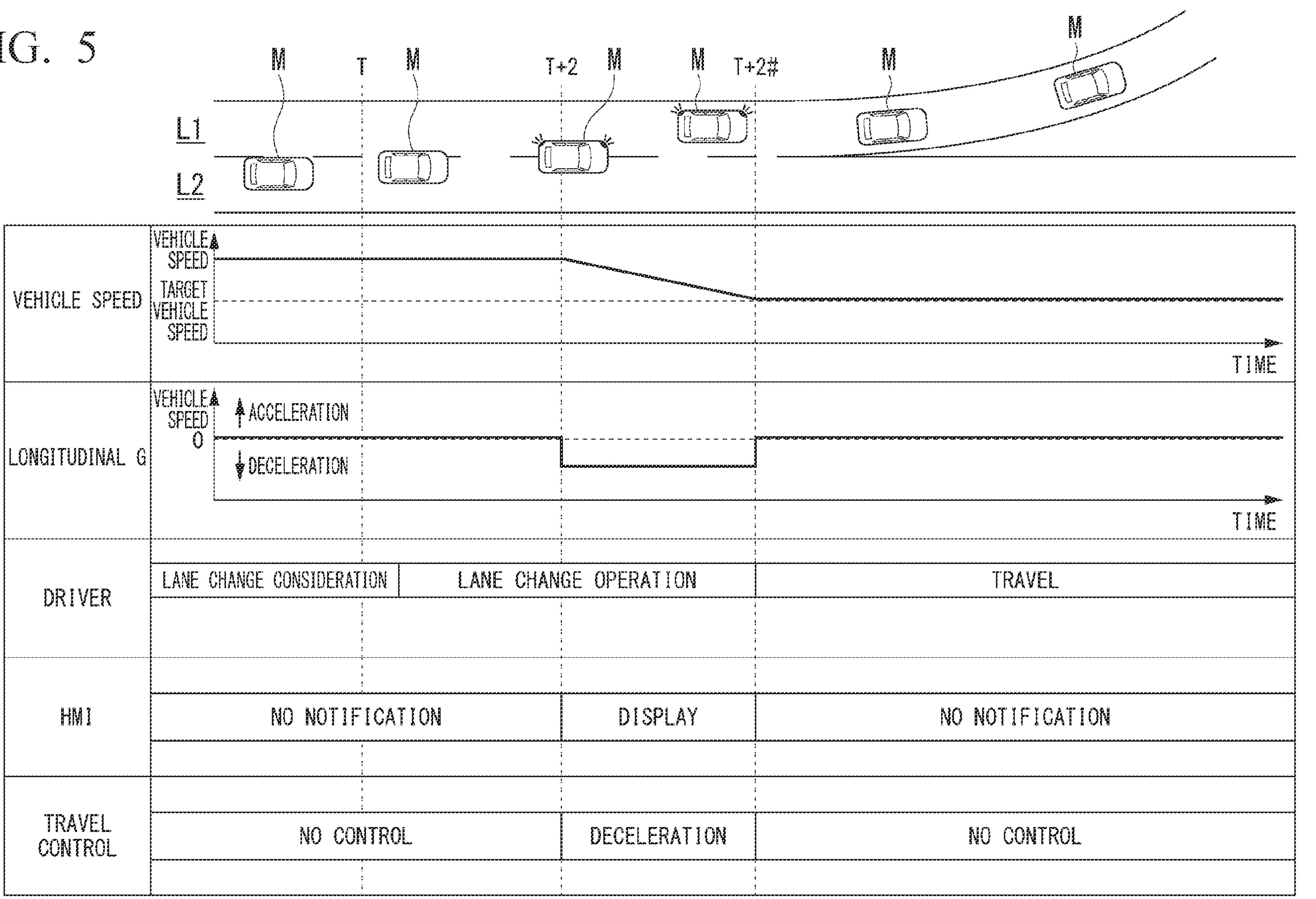
FIG. 5 is a diagram for describing a process of operating the assistance control based on a lane change.

FIG. 5 is a diagram for describing a process of operating the assistance control based on a lane change. As shown in FIG. 5, in the above-described segment (for example, at time T+2), when the vehicle M has made a lane change from the second lane L2 to the first lane L1, the assistance controller 160 operates the assistance control. In this case, the assistance controller 160 decelerates the vehicle M and further operates a notification or warning.

After the lane change, the assistance controller 160 controls the speed of the vehicle M on the basis of the curved road information of the curved road connected to the first lane L1. For example, the assistance controller 160 controls the speed of the vehicle M by decelerating the vehicle M so that the speed of the vehicle M approaches or reaches a target speed. The target speed is, for example, a speed obtained on the basis of curved road information (a curve radius and curvature of a curve), a speed set for a curved road, a legal speed of the curved road, and the like.

As described above, when the vehicle M has made a lane change from the second lane L2 to the first lane L1, the assistance controller 160 can perform assistance so that the vehicle M smoothly travels on a curved road by operating the assistance control and performing deceleration corresponding to the curved road.

Although an example in which a lane change is made before the vehicle M enters the curved road has been described above with reference to FIGS. 3 and 4, a process of operating or stopping assistance control may be controlled in accordance with characteristics of a lane of a lane change destination similarly even if a lane change is made while the vehicle M is traveling on a curved road in addition to (or in place of) this. For example, when the road has a shape for enabling a lane change to an adjacent lane after the vehicle M enters the curved road, a process of operating or stopping the assistance control may be controlled in accordance with the characteristics of the lane of the lane change destination as described above.

[Determination of Lane Change]

The determiner 150 determines whether or not the vehicle M has made a lane change on the basis of, for example, a position of the vehicle M and a position of the road marking. The road marking is a marking for dividing the first lane L1 and the second lane L2. For example, the determiner 150 determines that the vehicle M has made the lane change when a reference position of the vehicle M has reached the road marking or the reference position of the vehicle M has exceeded the road marking. The reference position may be any position or may be the center or near the center of the vehicle M in the width direction. The determiner 150 determines whether or not the reference position has reached the road marking on the basis of, for example, a position of the road marking recognized by the recognizer 110 with respect to the vehicle M.

The determiner 150 can determine a lane change even if the driver does not use the direction indicator. Thereby, the assistance controller 160 can reliably assist the driver in driving.

The determiner 150 may determine a lane change on the basis of an ON/OFF state of the direction indicator 72. For example, the determiner 150 may determine that the vehicle M has made a lane change when the driver has performed an operation of flashing the direction indicator 72 or when the direction indicator 72 has flashed according to an operation.

The determiner 150 can determine a lane change at an early stage on the basis of the operation on the direction indicator. Thereby, the assistance controller 160 can assist the driver by performing control corresponding to the lane change at an early stage.

Alternatively, the determiner 150 may determine that the vehicle M has made a lane change when a predetermined proportion or more of a vehicle body of the vehicle M has entered a lane of a lane change destination or may determine that the vehicle M has made a lane change when the driver has operated the steering wheel to a predetermined degree or more so that the vehicle M is allowed to make the lane change.

The determiner 150 may determine that the vehicle M has made a lane change when the above-described plurality of conditions are satisfied. For example, the determiner 150 may determine that the vehicle M has made the lane change when the reference position of the vehicle M reaches the road marking and the direction indicator 72 has flashed or an operation of flashing the direction indicator 72 has been performed.

[Flowchart Related to Assistance Control]

Figure 6:
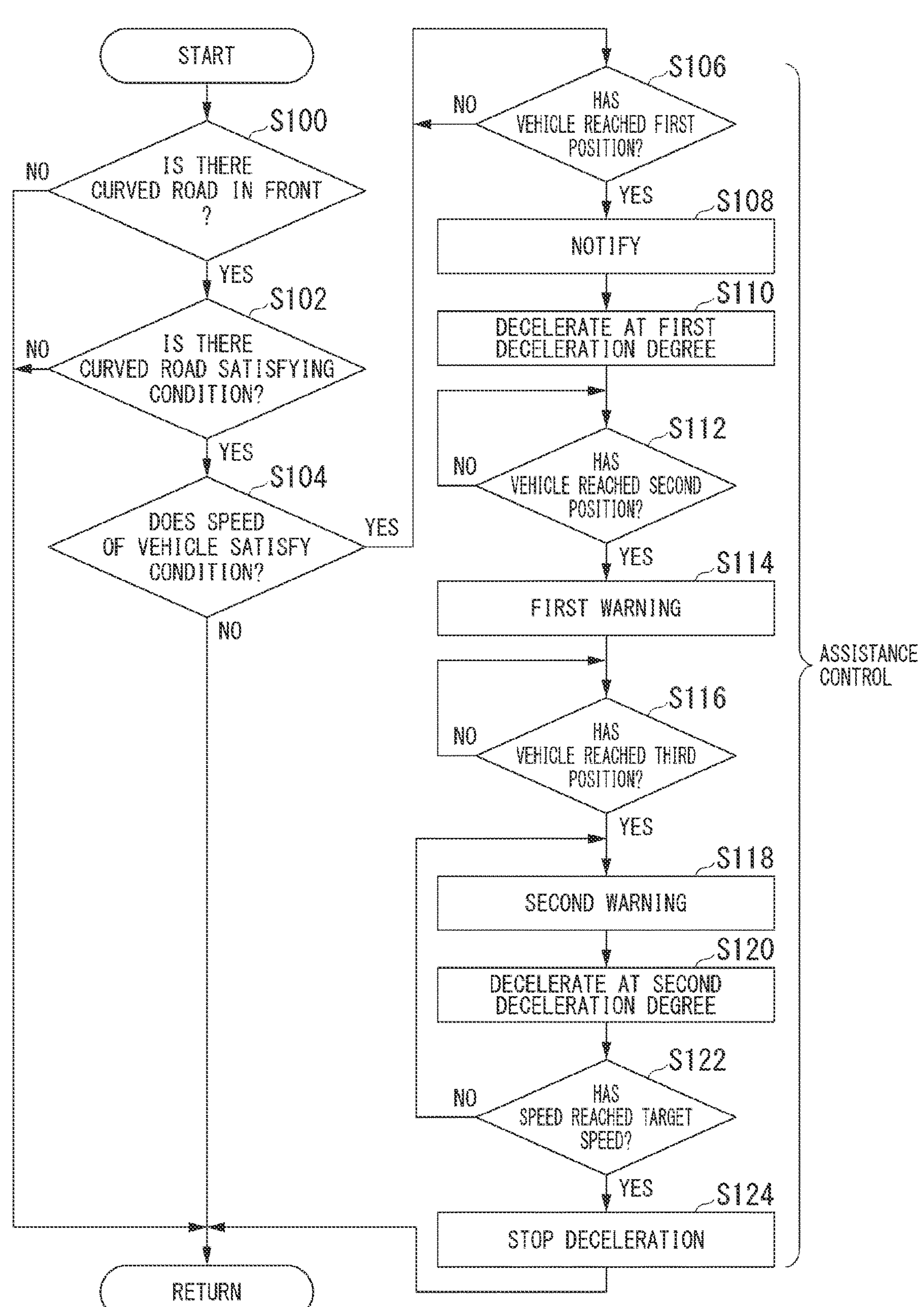
FIG. 6 is a flowchart showing an example of a flow of a process executed by a driving assistance device.

FIG. 6 is a flowchart showing an example of a flow of a process executed by the driving assistance device 100. The order of processing in the present flowchart may be changed or some processing may be omitted (the flowcharts of FIGS. 7 and 8 to be described below are similar).

First, the driving assistance device 100 determines whether or not there is a curved road in front of a predetermined distance from the position of the vehicle M (step S100). When there is a curved road, the driving assistance device 100 determines whether or not the curved road is a curved road that satisfies a condition (step S102). When the curved road is a curved road that satisfies the condition, the driving assistance device 100 determines whether or not a speed of the vehicle M satisfies a condition (step S104). If the determination of step S100, S102, or S104 is negative, the process of one routine of the present flowchart ends.

When the speed of the vehicle satisfies the condition, the driving assistance device 100 determines whether or not the vehicle M has reached a first position (for example, the position Pin FIG. 2) (step S106). When the vehicle M has reached the first position, the driving assistance device 100 provides a notification (step S108) and decelerates the vehicle M at a first deceleration degree (step S110).

Subsequently, the driving assistance device 100 determines whether or not the vehicle M has reached a second position (for example, the position P1 in FIG. 2) (step S112). When the vehicle M has reached the second position, the driving assistance device 100 performs a first warning (step S114). Subsequently, the driving assistance device 100 determines whether the vehicle M has reached a third position (for example, the position P2 in FIG. 2) (step S116).

When the vehicle M has reached the third position, the driving assistance device 100 performs a second warning (step S118) and decelerates the vehicle M at a second deceleration degree (step S122). Subsequently, it is determined whether or not the speed of the vehicle M has reached the target speed (step S122). When the speed of the vehicle M has not reached the target speed, the process returns to step S118. When the speed of the vehicle M has reached the target speed, the driving assistance device 100 stops the deceleration of the vehicle M (step S124). Thereby, the process of one routine of the present flowchart ends.

As described above, the driving assistance device 100 can assist the driver so that the vehicle M can travel more smoothly on the curved road by executing assistance control (steps S106 to S124) when the vehicle M and the curved road satisfy a condition.

In the process of the above-described flowchart, when the brake override or accelerator override is established, the assistance control is stopped.

[Flowchart Related to Process of Operating or Stopping Assistance Control (Part 1)]

FIG. 7 is a flowchart showing an example of a flow of a process executed by the assistance controller 160. This process is a process when assistance control is not executed. This process is a process corresponding to FIG. 5.

First, the assistance controller 160 determines whether or not the vehicle M is traveling in a lane adjacent to a lane of an assistance control target (step S200). When the vehicle M is traveling in the adjacent lane, the assistance controller 160 determines whether or not a lane change has been made (step S202). When the lane change has not been made, the process returns to step S200.

When the lane change has been made (the lane change to the lane of the assistance control target connected to the curved road has been made), the assistance controller 160 derives a target speed corresponding to curved road information of the curved road connected to a lane of a lane change destination (step S206). Subsequently, the assistance controller 160 derives a deceleration degree corresponding to the target speed (step S208) and decelerates the vehicle M with the derived deceleration degree (step S210). In this case, the vehicle M is controlled as shown in FIG. 5 described above. Thereby, the process of one routine of the present flowchart ends.

As described above, when the vehicle M has made a lane change from a second lane L2 to a first lane L1, the assistance controller 160 can perform assistance so that the vehicle M smoothly travels on the curved road by operating the assistance control and performing deceleration corresponding to the curved road.

[Flowchart Related to Process of Operating or Stopping Assistance Control (Part 2)]

Figure 8:
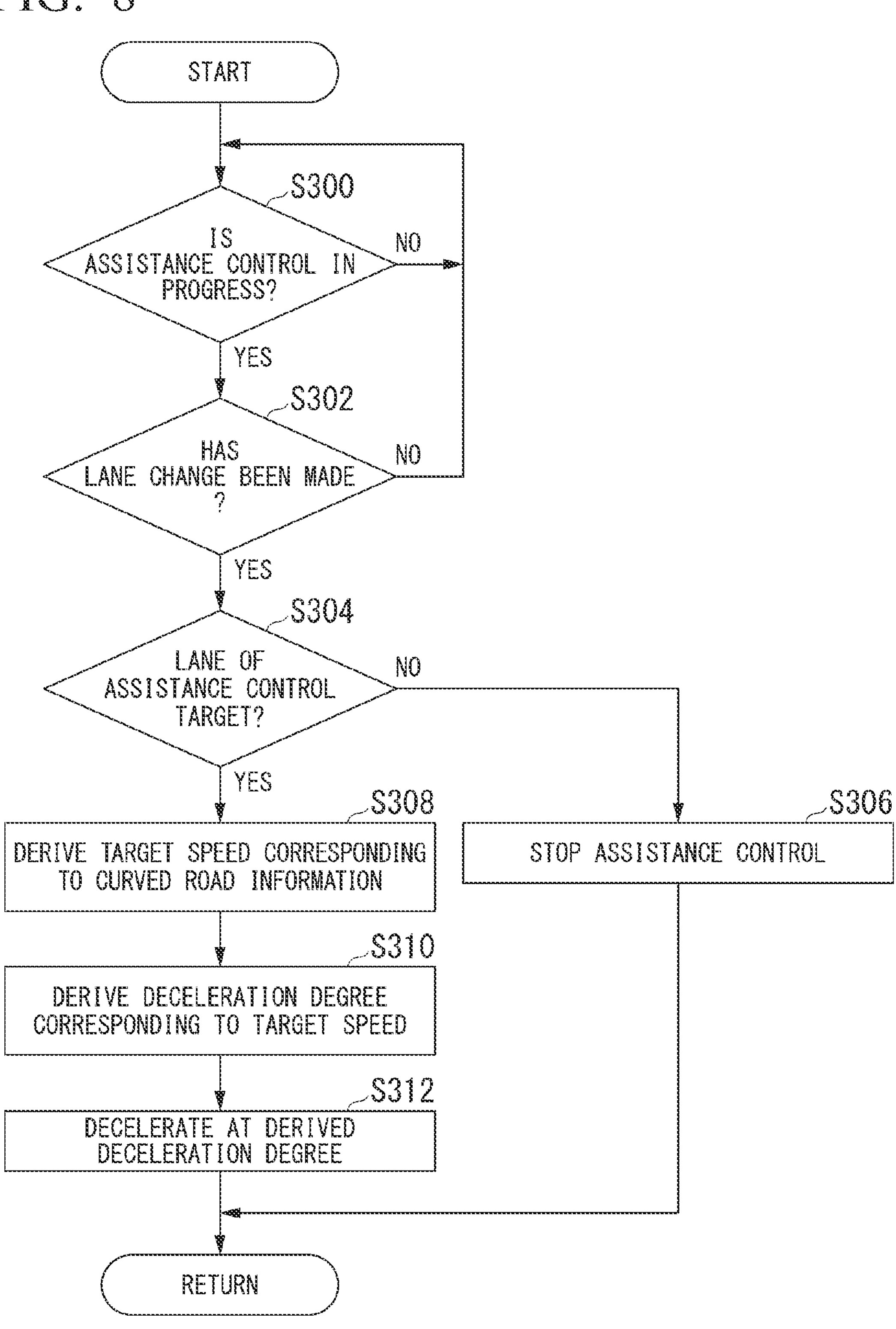
FIG. 8 is a flowchart showing another example of a flow of a process executed by the assistance controller.

FIG. 8 is a flowchart showing another example of a flow of a process executed by the assistance controller 160. This process is a process when assistance control is executed. This process is a process corresponding to FIG. 4.

First, the assistance controller 160 determines whether or not assistance control is in progress (step S300). When assistance control is in progress, the assistance controller 160 determines whether or not a lane change has been made (step S302). When the lane change has not been made, the process returns to step S300. When the lane change has been made, the assistance controller 160 determines whether or not a lane of a lane change destination is a lane of an assistance control target (step S304).

When the lane of the lane change destination is not the lane of the assistance control target (when the lane of the lane change destination is not connected to a curved road different from the curved road connected to a first lane L1), the assistance controller 160 stops the assistance control (step S306). In this case, the vehicle M is controlled as shown in FIG. 4 described above. Thereby, the process of one routine of the present flowchart ends.

When the lane of the lane change destination is the lane of the assistance control target (when the lane of the lane change destination is connected to a curved road different from the curved road connected to the first lane L1), the assistance controller 160 derives a target speed corresponding to curved road information of the different curved road (step S308). Subsequently, the assistance controller 160 derives a deceleration degree corresponding to the target speed (step S310) and decelerates the vehicle M with the derived deceleration degree (step S312). In this case, the vehicle M is controlled as shown in FIG. 8 to be described below. Thereby, the process of one routine of the present flowchart ends.

Figure 9:
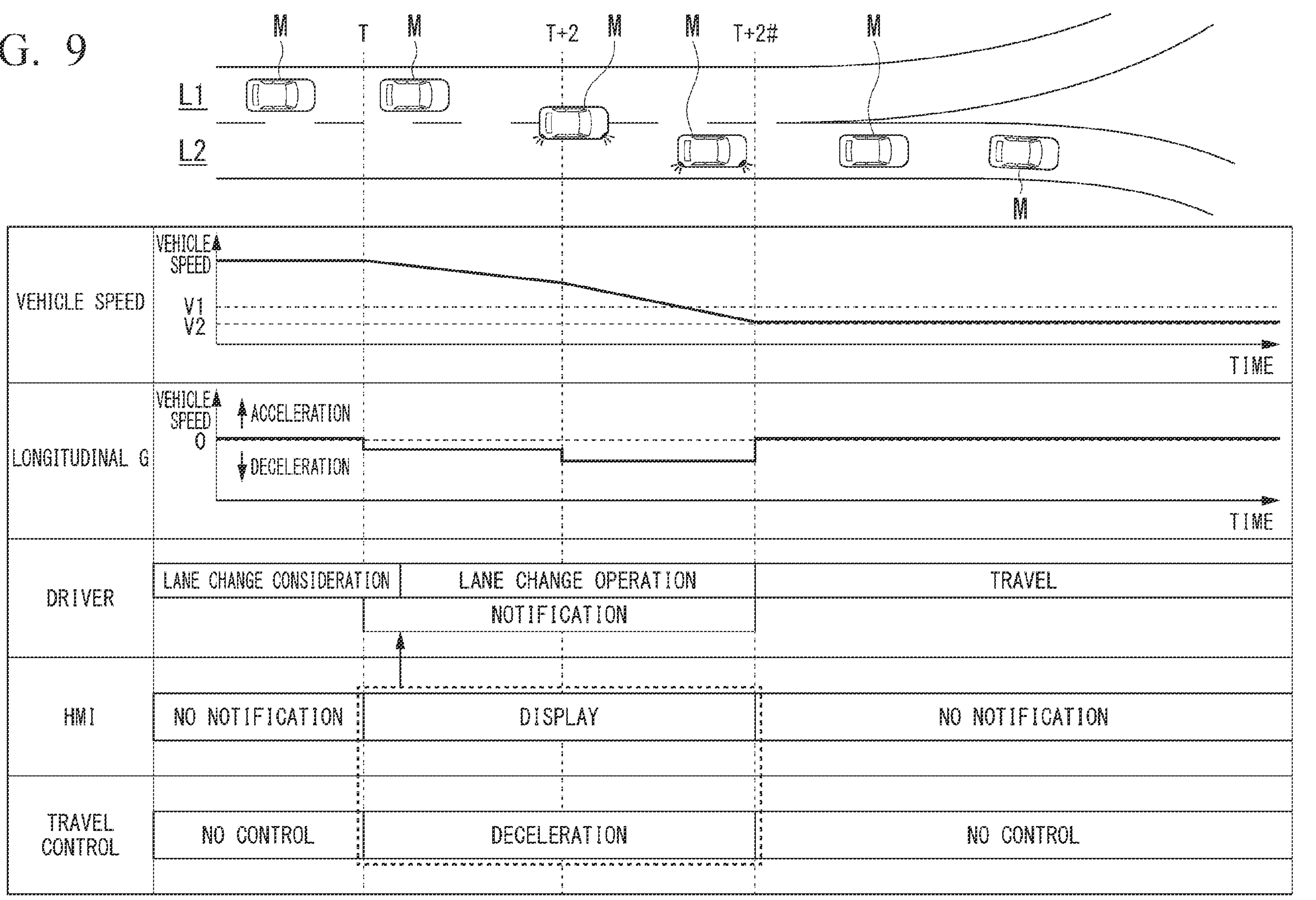
FIG. 9 is a diagram for describing a process when a lane of a lane change destination is connected to a curved road.

FIG. 9 is a diagram for describing a process when a lane of a lane change destination is connected to a curved road. The assistance controller 160 performs assistance control on the basis of curved road information about a second curved road when the vehicle M has made a lane change to a second lane L2, which is connected to a second curved road different from a first curved road connected to a first lane L1 and is adjacent to the first lane L1, while the vehicle M is traveling in the first lane L1 in the above-described segment. This process is an example of a process in which "the controller controls the operation of the assistance control in accordance with presence or absence of the lane change of the vehicle while the vehicle is traveling in the segment or on the curved road."

As shown in FIG. 9, when the vehicle M is traveling in the first lane L1 and is driving while decelerating to a target speed V1 corresponding to the curved road information of the first curved road, the notification (or warning) and the deceleration continue in a case where the vehicle M has made the lane change from the first lane L1 to the second lane L2. In other words, the assistance control is switched from the assistance control for the first curved road to the assistance control for the second curved road. When the vehicle M has made the lane change to the second lane L2, the vehicle M is decelerated to the target speed V2 corresponding to the second curved road. For example, when a curve radius of the second curved road is smaller than a curve radius of the first curved road, a target speed of the assistance control for the second curved road is lower than a target speed of the assistance control for the first curved road. Also, in FIG. 9, the driver performs a brake pedal override at time T+2 #.

In the above-described example, the assistance control for the first curved road may be stopped according to the lane change and then the assistance control for the second curved road may be operated. For example, the assistance controller 160 may notify the driver of the stop of the operation and the start of the operation so that the driver is allowed to recognize that the curved road of the assistance control target has been switched.

As described above, the assistance controller 160 can perform assistance so that the vehicle M smoothly travels on the curved road by operating (continuing) the assistance control in accordance with characteristics of the lane of the lane change destination and performing deceleration corresponding to the curved road.

[Other]

The above-described assistance control may be performed even if lane keeping control is performed. Further, the above-described lane change may be a lane change based on an ALC function. In this case, the assistance control may be stopped on the basis of relative positions of the vehicle M and the road marking as described above or the assistance control may be stopped when a lane change instruction based on the ALC function has been issued.

According to the above-described embodiment, the assistance controller 160 can appropriately control an assistance control process by controlling a process of operating or stopping the assistance control in accordance with presence or absence of the lane change of the vehicle M during traveling in the above-described segment.

The embodiment described above can be represented as follows.

A control device including:

a storage device storing a program; and a hardware processor, the hardware processor executing the program stored in the storage device to:

acquire curved road information about a curved road located in a travel direction of a vehicle;

determine whether or not the vehicle has made a lane change;

perform assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and control a process of operating or stopping the assistance control in accordance with presence or absence of the lane change of the vehicle while the vehicle is traveling in the segment or on the curved road.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:

a storage medium storing computer-readable instructions; and one or more processors connected to the storage medium, the processor executing the computer-readable instructions to:

acquire curved road information about a curved road located in a travel direction of a vehicle;

determine whether or not the vehicle has made a lane change;

perform assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and control a process of operating or stopping the assistance control in accordance with presence or absence of the lane change of the vehicle while the vehicle is traveling in the segment or on the curved road, wherein the assistance control comprises:

decelerating the vehicle at a first deceleration degree when the vehicle is traveling in the first lane and has reached a start point of the segment, and providing a notification indicating that the speed of the vehicle is greater than the target speed, performing a warning that makes the driver aware of the curved road before causing the vehicle to decelerate at a second deceleration degree that is a deceleration degree greater than the first deceleration degree and after causing the vehicle to decelerate at the first deceleration degree, decelerating the vehicle at the second deceleration degree in a case that the vehicle approaches the curved road further after the warning, and determining that the driver recognizes that the vehicle is approaching the curved road and stop the assistance control in a case that the driver operates the brake pedal at a predetermined operation degree and for more than a predetermined time according to the deceleration, the notification or the warning in the assistance control, or stop the assistance control in a case that the vehicle has made the lane change to a second lane adjacent to the first lane and not connected to the curved road in the assistance control.

2. The vehicle control device according to claim 1, wherein the processor executes the computer-readable instructions to stop the assistance control when the vehicle has made the lane change to a second lane, which is not connected to the curved road and is adjacent to a first lane, while the vehicle is traveling in the first lane in the segment.

3. The vehicle control device according to claim 1, wherein the processor executes the computer-readable instructions to operate the assistance control when the vehicle is making the lane change to the first lane while the vehicle is traveling in a second lane adjacent to the first lane and not connected to the curved road in the segment.

4. The vehicle control device according to claim 2, wherein the processor executes the computer-readable instructions to decelerate the vehicle at a first deceleration degree when the vehicle is traveling in the first lane and has reached a start point of the segment and decelerate the vehicle at a second deceleration degree greater than the first deceleration degree when the vehicle has further approached the entrance to the curved road.

5. The vehicle control device according to claim 4, wherein the processor executes the computer-readable instructions to start a notification for notifying the driver of the vehicle that the curved road is approaching after the vehicle is decelerated at the first deceleration degree and before the vehicle is decelerated at the second deceleration degree.

6. The vehicle control device according to claim 2, wherein the processor executes the computer-readable instructions to determine that the vehicle has made the lane change when a reference position of the vehicle has reached the second lane or a road marking for dividing the first lane and the second lane.

7. The vehicle control device according to claim 6, wherein the reference position is set at a center of the vehicle or near the center of the vehicle related to a vehicle width direction.

8. The vehicle control device according to claim 2, wherein the processor executes the computer-readable instructions to determine the lane change on the basis of an ON or OFF state of a direction indicator.

9. The vehicle control device according to claim 1, wherein the processor executes the computer-readable instructions to perform the assistance control on the basis of curved road information about a different curved road when the vehicle has made a lane change to a third lane connected to a curved road different from the curved road connected to the first lane and adjacent to the first lane while the vehicle is traveling in the first lane in the segment.

10. A vehicle control method comprising:

acquiring, by a computer, curved road information about a curved road located in a travel direction of a vehicle;

determining, by the computer, whether or not the vehicle has made a lane change;

performing, by the computer, assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and controlling, by the computer, a process of operating or stopping the assistance control in accordance with presence or absence of the lane change of the vehicle while the vehicle is traveling in the segment or on the curved road, wherein the assistance control comprises:

decelerating, by the computer, the vehicle at a first deceleration degree when the vehicle is traveling in the first lane and has reached a start point of the segment, and providing a notification indicating that the speed of the vehicle is greater than the target speed, performing, by the computer, a warning that makes the driver aware of the curved road before causing the vehicle to decelerate at a second deceleration degree that is a deceleration degree greater than the first deceleration degree and after causing the vehicle to decelerate at the first deceleration degree, decelerating, by the computer, the vehicle at the second deceleration degree in a case that the vehicle approaches the curved road further after the warning, and determining, by the computer, that the driver recognizes that the vehicle is approaching the curved road and stop the assistance control in a case that the driver operates the brake pedal at a predetermined operation degree and for more than a predetermined time according to the deceleration, the notification or the warning in the assistance control, or stop the assistance control in a case that the vehicle has made the lane change to a second lane adjacent to the first lane and not connected to the curved road in the assistance control.

11. A non-transitory computer storage medium storing a program for causing a computer to:

acquire curved road information about a curved road located in a travel direction of a vehicle;

determine whether or not the vehicle has made a lane change;

perform assistance control which is one or both of deceleration control for decelerating the vehicle so that a speed of the vehicle approaches a target speed based on the curved road information and notification control for notifying that the speed of the vehicle approaches the target speed while the vehicle is traveling in a first lane connected to the curved road in a segment from an entrance to the curved road to a position a predetermined distance before the entrance or while the vehicle is traveling on the curved road; and control a process of operating or stopping the assistance control in accordance with presence or absence of the lane change of the vehicle while the vehicle is traveling in the segment or on the curved road, wherein the assistance control comprises:

decelerating the vehicle at a first deceleration degree when the vehicle is traveling in the first lane and has reached a start point of the segment, and providing a notification indicating that the speed of the vehicle is greater than the target speed, performing a warning that makes the driver aware of the curved road before causing the vehicle to decelerate at a second deceleration degree that is a deceleration degree greater than the first deceleration degree and after causing the vehicle to decelerate at the first deceleration degree, decelerating the vehicle at the second deceleration degree in a case that the vehicle approaches the curved road further after the warning, and determining that the driver recognizes that the vehicle is approaching the curved road and stop the assistance control in a case that the driver operates the brake pedal at a predetermined operation degree and for more than a predetermined time according to the deceleration, the notification or the warning in the assistance control, or stop the assistance control in a case that the vehicle has made the lane change to a second lane adjacent to the first lane and not connected to the curved road in the assistance control.

* * * * *